(12) United States Patent
Montana

(10) Patent No.: US 8,274,016 B2
(45) Date of Patent: Sep. 25, 2012

(54) CUP WARMER

(76) Inventor: Mark Montana, Tempe, AZ (US)

( * ) Notice: Subject to any disclaimer, the term of this patent is extended or adjusted under 35 U.S.C. 154(b) by 440 days.

(21) Appl. No.: 12/576,843

(22) Filed: Oct. 9, 2009

(65) Prior Publication Data
US 2010/0089901 A1 Apr. 15, 2010

Related U.S. Application Data

(60) Provisional application No. 61/104,349, filed on Oct. 10, 2008.

(51) Int. Cl.
F27D 11/00 (2006.01)
H05B 1/02 (2006.01)
(52) U.S. Cl. ........................ 219/385; 219/518
(58) Field of Classification Search .................. 219/385, 219/518
See application file for complete search history.

(56) References Cited

U.S. PATENT DOCUMENTS
2009/0038317 A1* 2/2009 Otey .................................. 62/3.2
2011/0011850 A1* 1/2011 Rosenbloom et al. ......... 219/622
* cited by examiner Primary Examiner — David S Blum

(57) ABSTRACT

A cup holder comprises a heating surface that is configured to receive a cardboard cup. The cup holder has an outside surface that is concentric with the heating surface. A heating element is disposed between the heating surface and the outside surface, and the heating element is configured to heat the heating surface. Insulation may be located between the heating surface and the outside surface, and the insulation may be configured to maintain the outside surface at an outside temperature lower than a heating temperature of the heating surface. The cup holder further comprises a pressure-sensitive switch located in a bottom portion of the heating surface. The pressure sensitive switch may allow a current to run through the heating element in response to the cardboard cup exerting pressure on the pressure-sensitive switch.

20 Claims, 7 Drawing Sheets

CUP WARMER

CROSS-REFERENCE TO RELATED APPLICATIONS

This application claims priority to and the benefit of U.S. Provisional Application Ser. No. 61/104,349 entitled, "Cup Warmer," which was filed on Oct. 10, 2008, the entirety of which is incorporated herein by reference.

FIELD OF THE INVENTION

This invention is generally related to a device for warming a cup and a liquid contained therein, and more particularly to a device that includes a triggering device to facilitate warming the cup when the cup is placed in the device.

BACKGROUND

Cardboard cups have become a receptacle of choice for various hot beverages purchased from coffee shops, restaurants, convenience stores and the like, particularly where the beverages are not consumed at a restaurant but are purchased for "to go" consumption. Such hot beverages may include coffee, tea, and the like. The cardboard cups may have a plastic coating that facilitates the use of cardboard for a beverage receptacle.

Cardboard cups offer benefits such as their low cost and convenience, but they also have some disadvantages. For example, cardboard cups are generally not able to maintain a hot beverage at an elevated temperature for an extended period of time. Hot beverages are not as desirable once they have cooled off. In particular, many people have determined that approximately 140° Fahrenheit is the "ideal" temperature to enjoy a hot beverage. However, maintaining that temperature is virtually impossible unless a heat source is applied to the cup containing the hot beverage.

Polystyrene foam containers may be used to provide additional thermal insulation and slow the cooling rate, but polystyrene has become controversial due to medical and environmental concerns. In addition, polystyrene may negatively affect the taste of a hot beverage.

Automobile commuters may transfer hot beverages from the cardboard cup to an insulated container such as a mug. These insulated containers may be effective in maintaining the hot beverage at an elevated temperature, however these insulated containers have several disadvantages. The commuter generally needs to carry the insulated container to the beverage purchase location, or have it available nearby. Additionally, the commuter then often actually transfers the hot beverage from the cardboard cup to the insulated container and risks burning himself or spilling the beverage. Further, transferring the hot beverage in a moving vehicle may prove particularly challenging. Moreover, such insulated containers are not generally convenient because they also may need to be washed out regularly, resulting in some of the convenience of the cardboard cup being lost.

SUMMARY

As set forth in the detailed description, in accordance with various embodiments of the present invention, cup holders configured to maintain and/or elevate the temperature of a beverage in a cardboard cup and similar receptacles are disclosed. An exemplary cup holder may have a heating surface that is configured to receive a cardboard cup. The cup holder may further have an outside surface that is concentric with the heating surface. A heating element may be disposed between the heating surface and the outside surface, and the heating element may be configured to heat the heating surface. Insulation may be located between the heating surface and the outside surface, and the insulation may be configured to maintain the outside surface at an outside temperature lower than a heating temperature of the heating surface. An exemplary cup holder may further have a pressure-sensitive switch located in a bottom portion of the heating surface. The pressure-sensitive switch may allow a current to run through the heating element in response to the cardboard cup exerting pressure on the pressure-sensitive switch.

In accordance with a further embodiment of the present invention, a cup holder may comprise a cavity that has a horizontal surface and a substantially vertical surface, wherein the cavity may be configured to receive a cardboard cup within the cavity. The cup holder may further include an outside surface that is substantially concentric with the substantially vertical surface of the cavity. A heating element may be disposed proximate the substantially vertical surface and between the cavity and the outside surface, wherein the heating element may be configured to heat the substantially vertical surface of the cavity. Insulation may be disposed between the cavity and the outside surface, wherein the insulation may be configured to maintain the outside surface at a temperature lower than a temperature of the substantially vertical surface. The cup holder may further include a pressure-sensitive switch disposed within the cavity, and the pressure-sensitive switch may include a trigger oriented vertically with respect to the horizontal surface of the cavity. The switch may be configured to allow a current to run through the heating element in response to the cardboard cup depressing the trigger, thereby toggling the pressure-sensitive switch.

Further embodiments of the invention provide a system that includes a cardboard cup and a cup holder. The cardboard cup may have a base and a wall, and the cardboard cup may be capable of holding a beverage. The cup holder may be capable of holding the cardboard cup, and the cup holder may have a pressure-sensitive switch and a heating element. The pressure-sensitive switch may be oriented vertically within the cup holder, and the pressure-sensitive switch may be configured to be toggled in response to the cardboard cup being placed within the cup holder. The heating element may be configured to heat the beverage through the wall of the cardboard cup in response to the cardboard cup toggling the pressure-sensitive switch.

BRIEF DESCRIPTION OF THE DRAWINGS

The subject matter of the invention is particularly pointed out and distinctly claimed in the concluding portion of the specification. Embodiments of the invention, however, may best be understood by reference to the following description taken in conjunction with the accompanying drawing figures, in which like parts may be referred to by like numerals.

FIG. 1b illustrates an exploded perspective view of the embodiment illustrated in FIG. 1a.

FIG. 2b illustrates an exploded perspective view of the embodiment illustrated in FIG. 2a.

FIG. 3b illustrates an exploded perspective view of the embodiment illustrated in FIG. 3a.

FIG. 4b illustrates an exploded perspective view of the embodiment illustrated in FIG. 4a.

FIG. 5b illustrates an exploded perspective view of the embodiment illustrated in FIG. 5a.

FIG. 6b illustrates a cut-away view of the embodiment illustrated in FIG. 6a.

DETAILED DESCRIPTION

Figure 1A:
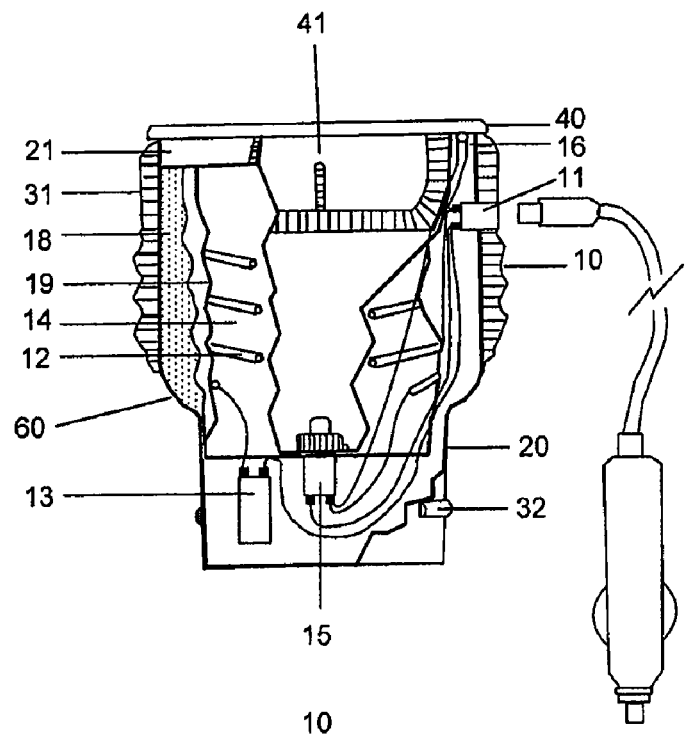
FIG. 1a illustrates a cut-away view of an embodiment of the present invention.

The following description is of exemplary embodiments of the invention and is not intended to limit the scope or applicability of the invention in any way. Rather, the following description is intended to provide convenient illustrations for implementing various embodiments of the invention. Other configurations, materials, shapes, designs, and the like may be employed without departing from the scope of the present invention. As will become apparent, various other changes may be made to the methods described in these embodiments without departing from the spirit and scope of the invention.

Various embodiments of the present invention comprise an electrically heated receptacle configured to receive a beverage container, such as a plastic-coated cardboard hot-beverage container, and to elevate and/or maintain the temperature of a beverage within the beverage container. Electrical power sufficient to heat and/or maintain the beverage at a desired temperature is supplied by various mechanisms such as those disclosed herein. Although the electrically-heated receptacle may be referred to as a "cup warmer" in this disclosure, that phrase is merely for convenience and not for limitation. Any receptacle that may be configured to maintain, elevate, and/or manage the temperature of a beverage within a beverage container is contemplated within the scope of the present disclosure.

An exemplary cup warmer comprises an inner surface configured to receive a beverage container, and the cup warmer further comprises an outer surface. The space defined between the inner surface and the outer surface may be configured to be filled with insulating material. The insulating material may be configured to maintain the outside surface at an outside temperature lower than a heating temperature of the inside surface. A heating element may be disposed within the insulation-filled space and may be configured to elevate the temperature of the inner surface to facilitate the warming of the beverage within the beverage container. Thus, in some embodiments, the inner surface may be referred to as a heating surface. The outer surface may comprise an insulating material, a grip material, and/or a material that is configured to facilitate the placement of the cup warmer within a vehicle cup holder. In other embodiments, the cup warmer may have an appearance similar to existing mugs and/or other receptacles configured to receive heated beverages. In still other embodiments, the cup warmer may be integrated into a vehicle cup holder and be part of the vehicle cup holder itself.

An exemplary cup warmer may further comprise a trigger disposed within the cup warmer. For example, the trigger may be disposed in a bottom portion of the heating surface, such as on a bottom horizontal surface of the heating surface. The trigger may be configured to allow current to flow through the heating element. The trigger may be configured to be activated in response to the weight of the beverage container. In embodiment, the pressure-sensitive switch and/or trigger has a first position and a second position. When the beverage container is not in the cup warmer, the trigger is in the first, extended position. When the beverage container is placed in the cup warmer, the trigger is depressed to the second position. In the second position, the trigger may allow a current to run through the heating element to warm the cup warmer, the beverage container, and the beverage in the container. The trigger may further be configured to be activated manually and/or in response to a temperature of a portion of the cup warmer and/or the beverage in the beverage container. In other embodiments, the trigger may be configured to be activated by a plug-in actuator.

Figure 1B:
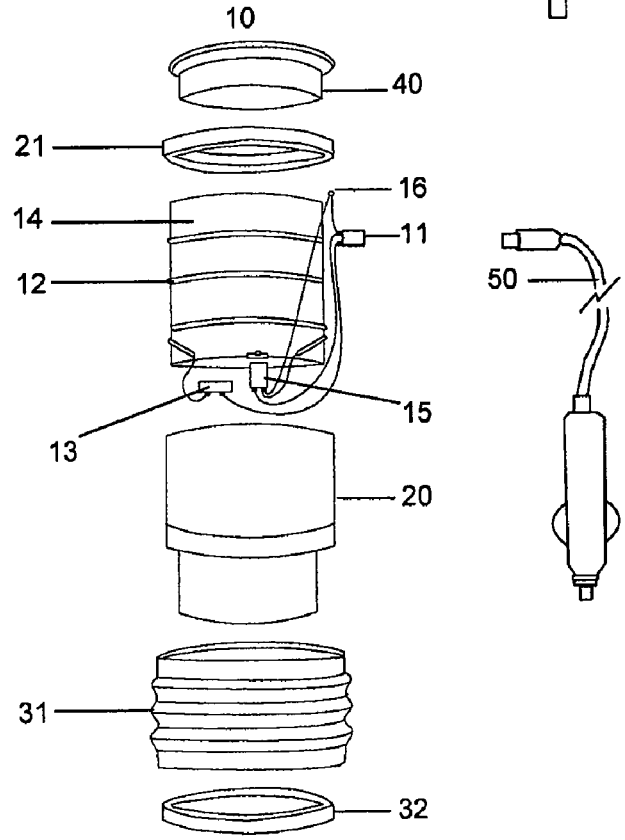
Figure 2A:
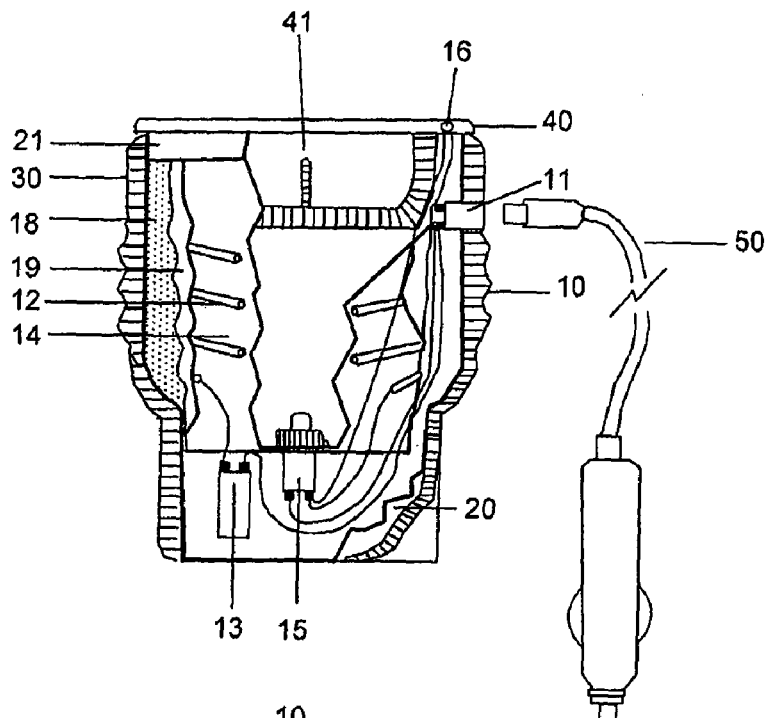
FIG. 2a illustrates a cut-away view of another embodiment of the present invention.
Figure 2B:
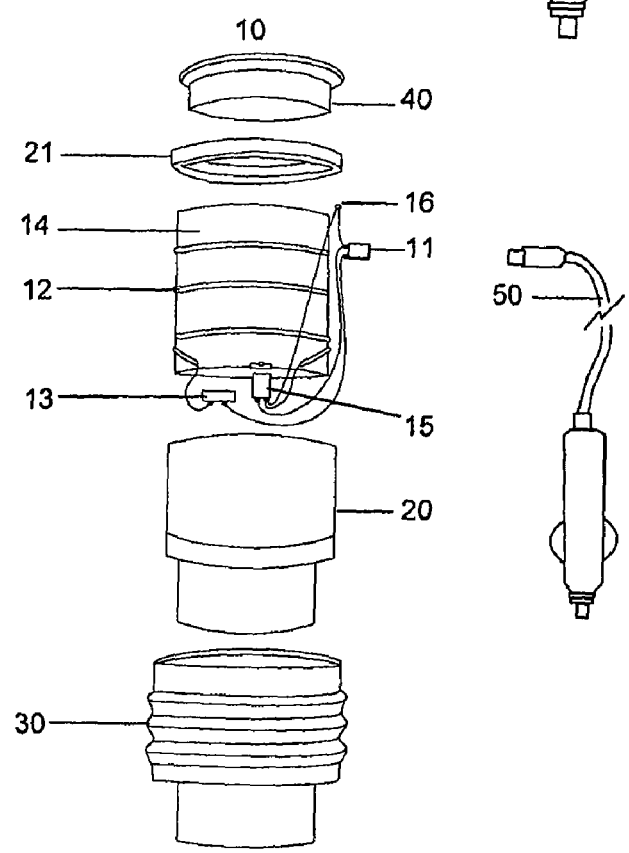
Figure 3A:
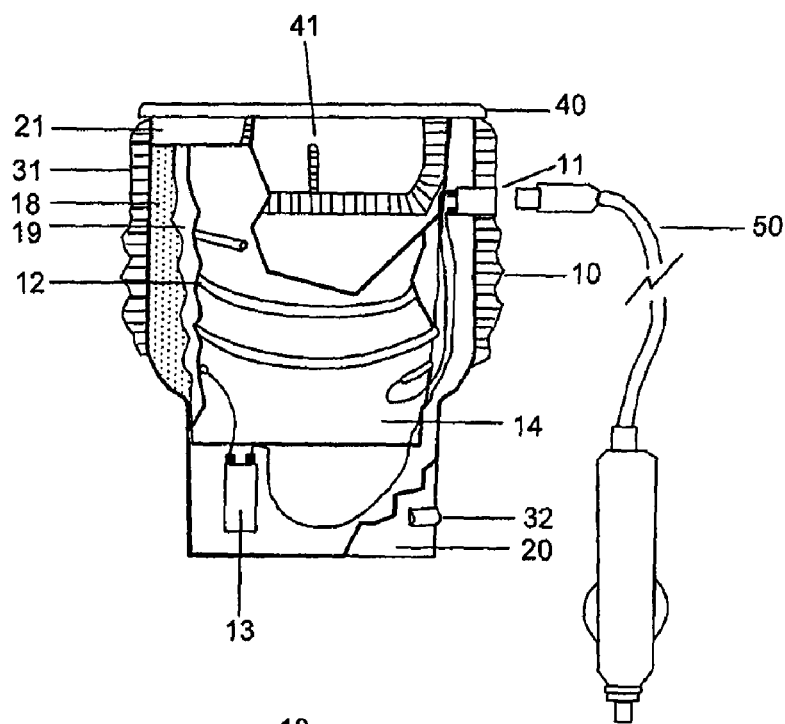
FIG. 3a illustrates a cut-away view of a further embodiment of the present invention.
Figure 3B:
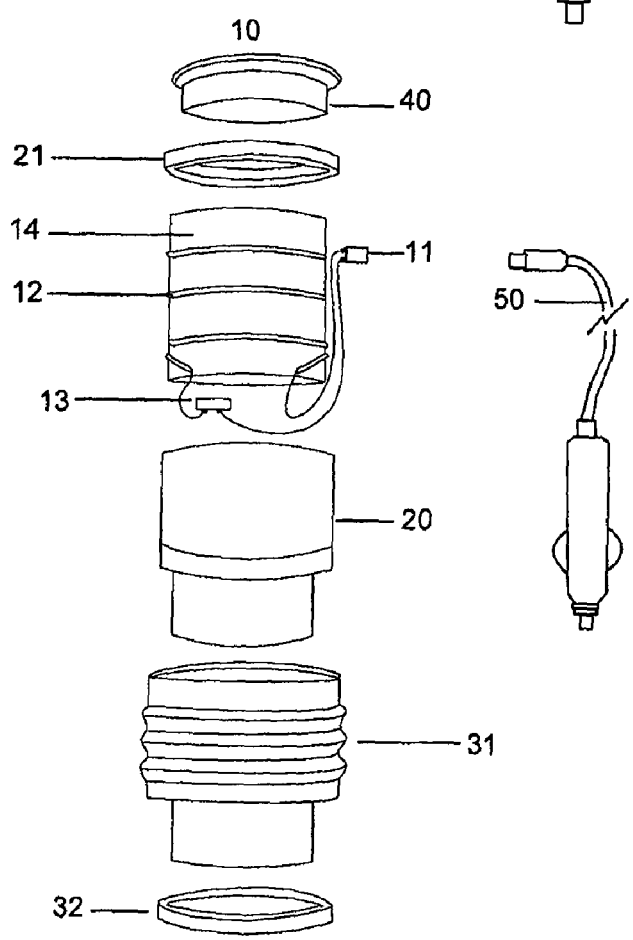
Figure 4A:
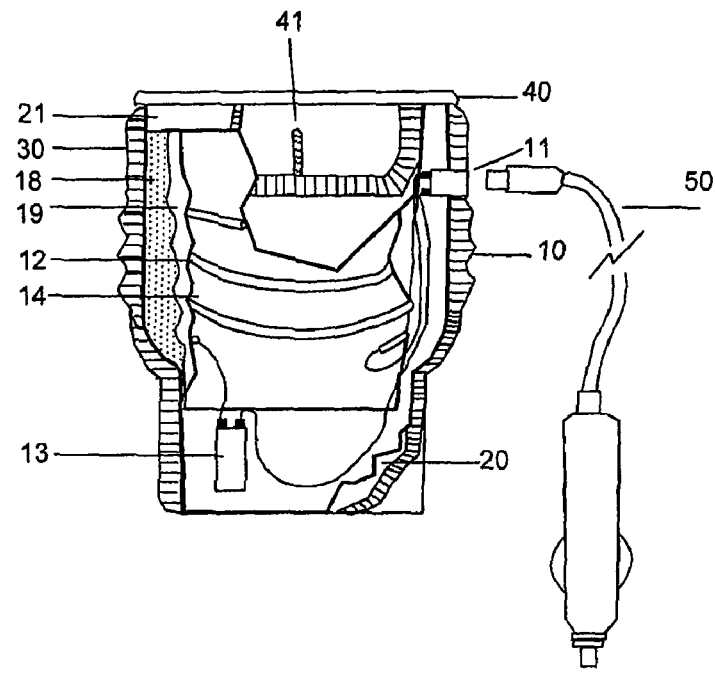
FIG. 4a illustrates a cut-away view of a still another embodiment of the present invention.
Figure 4B:
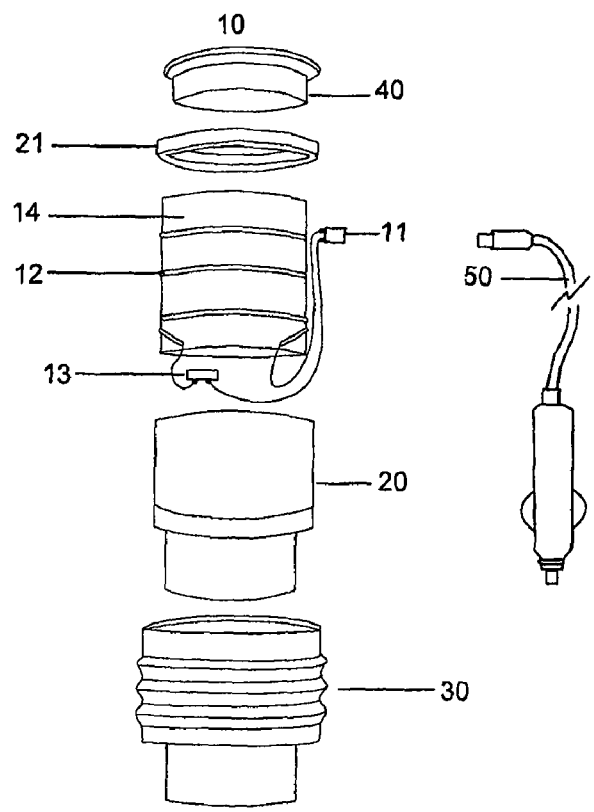

With reference to FIGS. 1a-1b, according to an embodiment of the present invention, cup warmer 10 comprises an outer surface 20. Outer surface 20 may be constructed of stainless steel, plastic, ceramics, composites, and the like.

In a further embodiment, outer surface 20 may be covered at least partially by a rubberized skin, for example closed-cell foam rubber and/or neoprene skin 31. In certain embodiments, with momentary reference to FIGS. 2a-2b and 4a-4b, skin 30 may substantially cover the outside of outer surface 20. Rubber skin 30, 31 may be of sufficient thickness so as to provide an insulating quality, thereby limiting temperature transfer to the outside of the cup warmer. In other embodiments, rubber skin 30, 31 may be configured to make outer surface 20 safe to touch, and/or may be configured to facilitate a snug fit into a vehicle cup holder. In still other embodiments, skin 30, 31 may comprise a ribbed surface configured to create co-axial grip within tension against the motor vehicle cup holder, facilitating prevention of accidental removal from the vehicle cup holder when the cardboard cup is removed. In an exemplary embodiment, skin 31 may terminate at a convergence point 60 of outer surface 20.

In accordance with a further embodiment, cup warmer 10 comprises an inner surface 14 configured to receive a beverage container, such as a cardboard cup. As used throughout this specification, the term "beverage container" is meant to denote any disposable or non-disposable beverage holder, cups, mugs, insulated containers, or any other device now known or developed in the future that holds beverages. In an exemplary embodiment, inner surface 14 comprises a stainless steel cup in the shape of a frustum of a cone with an open top and a closed bottom. In other embodiments, inner surface 14 may comprise any material configured to withstand temperatures to which the beverage container may be exposed. In still other embodiments, inner surface 14 may not comprise a closed bottom, and a separate surface may provide a bottom on which the beverage container is configured to rest. In yet other embodiments, inner surface 14 may comprise a horizontal surface and a substantially vertical surface. Further embodiments comprise an insulative material, such as foam insulation 19 or any other material configured to provide insulation, disposed between inner surface 14 and outer surface 20.

In one embodiment, inner surface 14 is constructed of aluminum. In other embodiments, inner surface is constructed from another conductive material such as stainless steel. In yet other embodiments, inner surface 14 is constructed from a material that is capable of quickly heating up when cup warmer 10 is activated and then quickly cooling down when cup warmer 10 is not activated. Cup warmer 10 can be "activated" when a beverage container is placed within it or when it is plugged in as set forth herein.

With continued reference to FIGS. 1a-4b, various embodiments of the invention comprise a heating element disposed between outer surface 20 and inner surface 14. In an exemplary embodiment, a heating coil 12 may be wrapped around inner surface 14 in the space between inner surface 14 and outer surface 20. Heating coil 12 may, in some embodiments, be wrapped in a temperature resistant adhesive tape 18. In other embodiments, heating coil 12 may not be physically in contact with inner surface 14; rather, heating coil 12 may be physically separated from but in thermodynamic communication with inner surface 14. Heating coil 12 may comprise any material configured to generate heat in response to current flowing through heating coil 12. According to further embodiments, cup warmer 10 may not comprise heating coil 12. Instead, a separate heating mechanism may be configured to provide heating functionality to cup warmer 10. For example, in one embodiment, inner surface 14 may itself be heated. In another embodiment a thermoelectric chip and/or plurality of thermoelectric chips may be configured to heat inner surface 14 of cup warmer 10. Any device capable of heating cup warmer 10 now know or used in the future can fall within the scope of the present invention.

In accordance with other embodiments of the invention, cup warmer 10 may be configured to utilize a power source. The power source may be configured to provide an electrical current to heating coil 12 and/or other heating mechanisms in cup warmer 10. The power source may be external and/or internal to cup warmer 10. For example, in one embodiment, cup warmer 10 is configured to be powered by a vehicle power source, such as a 12 volt direct current ("VDC") power source (from a standard vehicle battery). In other embodiments, cup warmer 10 may be configured to be powered by a 110 volt alternating current ("VAC") power source (standard household voltage in the United States). In such an embodiment, cup warmer 10 may comprise and/or may be configured to interface with a power adapter such that it may function both with 12 VDC and 110 VAC power supplies.

Further embodiments of cup warmer 10 comprise a power coupling, such as 12 VDC power receptacle 11 configured to receive a vehicle power adapter 50 configured to connect heating coil 12 to an electrical system of a motor vehicle. Power receptacle 11 may be configured to route electric current directly to heating coil 12, for example, in the embodiment illustrated in FIGS. 3a-4b. In other embodiments, for example, as illustrated in FIGS. 1a-2b, power receptacle 11 may be configured to route electric current through a switch. In such embodiments, as will be discussed further below, the switch may be configured to allow the current flow through heating coil 12 to be stopped and started depending on various conditions. Further embodiments comprise a thermoelectric device, such as a thermoelectric chip 13, disposed between power receptacle 11 and heating coil 12. Thermoelectric chip 13 may be configured to regulate current flowing through heating coil 12 in accordance with a desired temperature of cup warmer 10.

In accordance with yet other embodiments, cup warmer 10 may be configured to function with various other power supplies and/or connections to power supplies. For example, cup warmer 10 may comprise batteries configured to provide power to heating coil 12. In other embodiments, cup warmer 10 may comprise a connection configured to interface with a powered connection in a vehicle cup holder (e.g., powered by the vehicle electrical system), such that cup warmer 10 may be powered by placing and/or twisting cup warmer 10 in a vehicle cup holder. In still other embodiments, cup warmer 10 may be configured to receive power in any manner now known or hereafter developed.

Further embodiments comprise various indicators responsive to cup warmer 10 being powered and/or having current passing through heating coil 12. Cup warmer 10 may comprise an indicating light, such as light-emitting diode (LED) 16, configured to show a power-on condition. In other embodiments, cup warmer 10 may comprise a lighted rim at the opening configured to indicate a power-on condition. In still other embodiments, cup warmer 10 may provide other visual and/or audible (e.g., beeps, buzzes, noises, voice indications, and the like) signals configured to indicate to a user that cup warmer 10 is in a heating state.

Exemplary embodiments of the invention comprise a switch configured to regulate the flow of current through heating coil 12. As noted above, thermoelectric chip 13 may be configured to regulate the flow of current in accordance with a desired temperature of cup warmer 10. In further embodiments, cup warmer 10 may comprise a switch that is configured to allow a user to manually turn cup warmer 10 on and off, thereby regulating the flow of current through cup warmer 10. In still other embodiments, the switch may be configured to stop and/or limit the current flow through heating coil 12 in response to the temperature of a liquid within the beverage container and/or within cup warmer 10.

Further exemplary embodiments of the invention comprise a pressure-sensitive switch and/or trigger such as plunger switch 15 disposed in cup warmer 10. Plunger switch 15 may be configured to be activated in response to the beverage container being placed within cup warmer 10. In some embodiments, plunger switch 15 may be configured to allow current to flow through heating coil 12 in response to a beverage container having a certain amount of liquid therein begin placed within cup warmer 10. For example, plunger switch 15 may be configured to not allow current to flow through heating coil 12 if an empty or substantially empty (e.g., less than about one percent to ten percent of the total volume of the cardboard cup) beverage container is place within cup warmer 10. In an embodiment, the pressure sensitive switch allows current to run through the heating element in response to the amount of liquid being greater than about one percent to about ten percent of the total volume of the cardboard cup. In a further embodiment, the pressure may not be sufficient to toggle the pressure-sensitive switch if the amount of the liquid in the cardboard cup is less than about one percent to about ten percent of a total volume of the cardboard cup.

In certain embodiments, inner surface 14 may comprise an upper portion and a bottom portion. The bottom portion may comprise a bottom surface configured to receive at least a portion of the bottom surface of the beverage container. In such an embodiment, plunger switch 15 may be disposed adjacent the bottom surface of inner surface 14. For example, plunger switch 15 may comprise a center post configured to protrude vertically through the center of the bottom surface of inner surface 14, such that the center post is configured to be depressed in response to the beverage container being placed within cup warmer 10. In other embodiments, the plunger switch 15 may be disposed on the side of inner surface 14 such that plunger switch 15 is configured to be activated in response to the beverage container exerting substantially horizontal pressure on plunger switch 15. In still other embodiments, the bottom surface of the beverage container may be configured to rest on plunger switch 15 without contacting the bottom surface of inner surface 14. In further embodiments, the plunger switch or pressure sensitive switch may be disposed on a substantially vertical portion of inner surface 14, in the upper portion and/or bottom portion of inner surface 14.

In accordance with various embodiments, cup warmer 10 may comprise further components. For example, cup warmer 10 may comprise a rubber O-ring 32 with a half-circle cross-section configured be placed on the small diameter of outer surface 20, thereby facilitating retention of the cup warmer 10 in smaller vehicle cup holders. Cup warmer 10 may further comprise a plastic safety lid 40 having a center depression. Plastic safety lid 40 may be configured to prevent accidental touching of inner surface 14 and/or to prevent debris from falling into cup warmer 10. Plastic safety lid 40 may further comprise a depression configured to receive coins. Plastic safety lid 40, in other embodiments, comprises a vertical handle 41 which is configured to assist a user in removing plastic safety lid 40 from cup warmer 10.

In accordance with another embodiment, cup warmer 10 may be configured to operate in connection with a cup holder designed to receive cup warmer 10. In this embodiment, cup warmer 10 is designed to fit within a cup holder located in a car or other vehicle. In certain examples of this embodiment, cup warmer 10 may be "custom built" for a particular car cup holder's design and work only with that particular car cup holder. In other embodiments, cup warmer 10 is an integral part of a car cup holder and is installed during the assembly of the car. In yet other embodiments, cup warmer 10 may be built into an car during assembly, but be detachable to enable a user to use cup warmer 10 in other cars and vehicles.

Figure 5A:
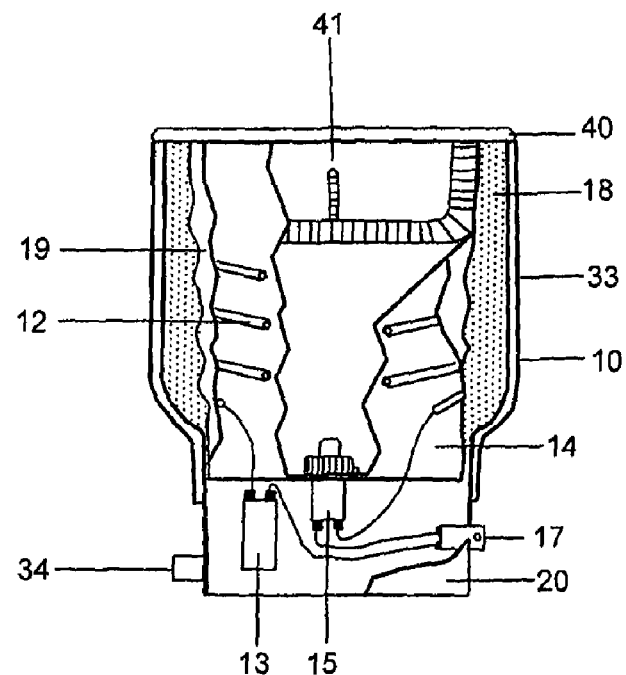
FIG. 5a illustrates a cut-away view of yet a further embodiment of the present invention.
Figure 5B:
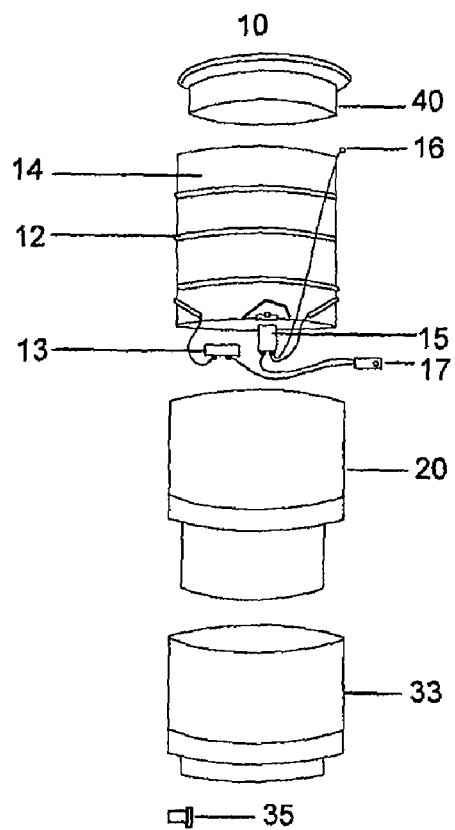

In one embodiment illustrated in FIGS. 5a and 5b, cup warmer 10 may comprise an insulated hard plastic outer shell 33 configured to fit intimately into a new cup holder design. A guiding key 35 may be configured to slide vertically down a slot in the cup holder may facilitate appropriate orientation of cup warmer 10. For example, a vehicle receptacle may comprise a slot, and guiding key 35 is configured to guide the cup holder into the vehicle receptacle. Once seated in the cup holder, cup warmer 10 may be rotated to lock it into position and to facilitate connection of a power source to the cup warmer. For example, the new cup holder design may be connected to a 12 VDC vehicle power supply, and rotating cup warmer 10 may facilitate connection of the 12 VDC supply to cup warmer 10.

Figure 6A:
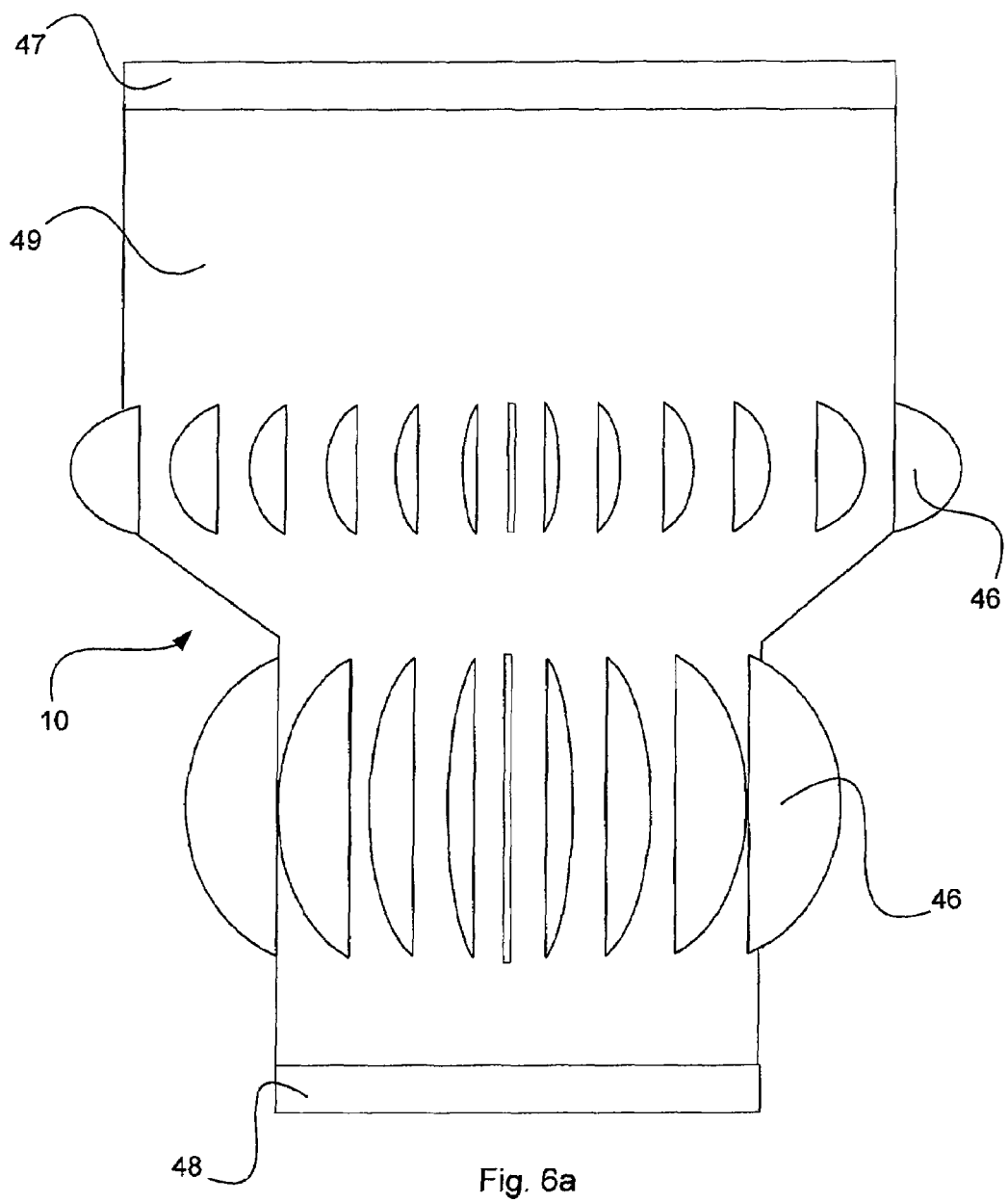
FIG. 6a illustrates a side view of an embodiment of the present invention.
Figure 6B:
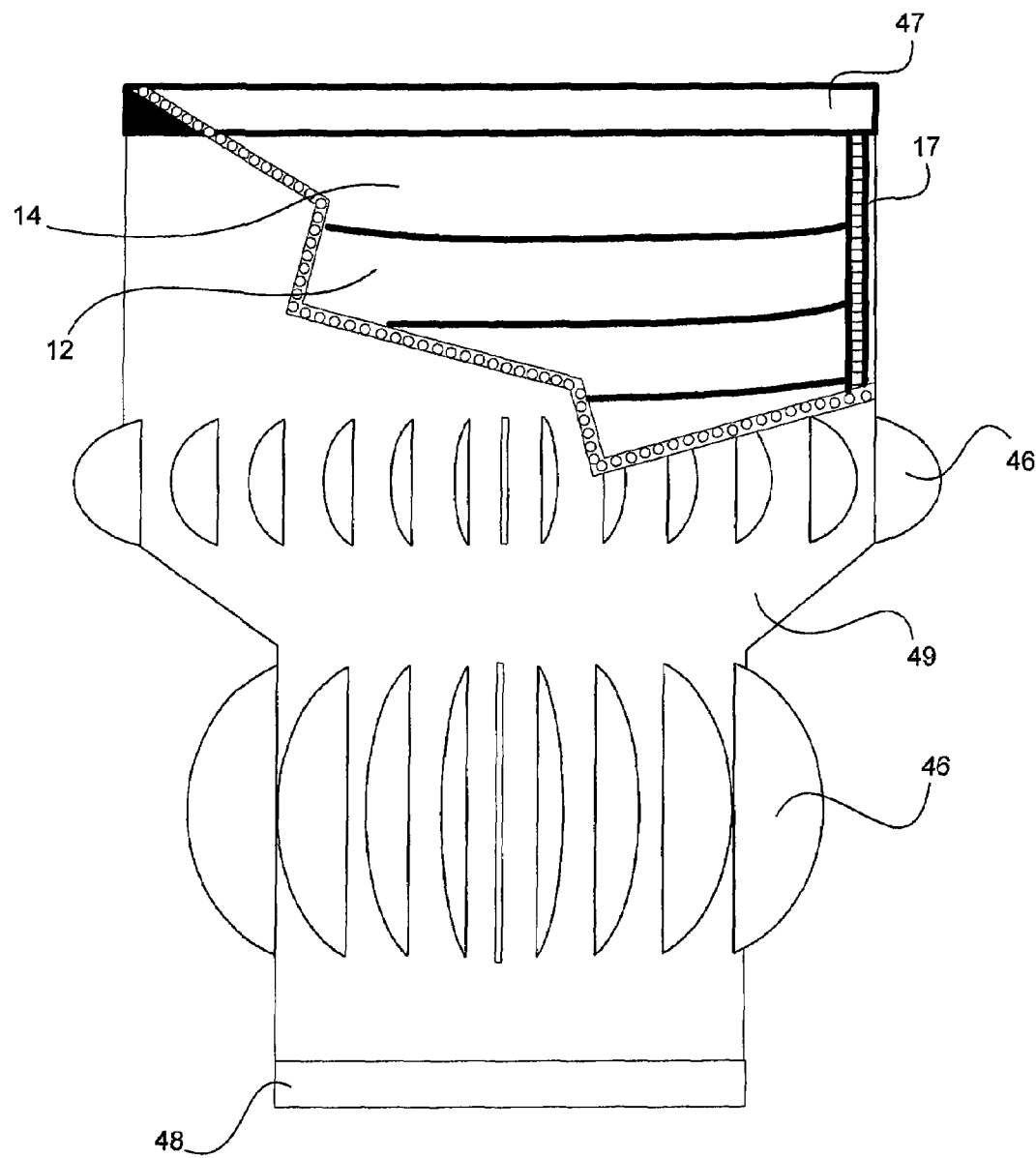

In an embodiment as illustrated in FIGS. 6a and 6b, cup warmer 10 has an inner stainless steel cup 14 that terminates near the top of cup warmer 10, where it meets an inner rim of a plastic shell 17 of cup warmer 10. The plastic shell includes an upper rim 47 and a lower base 48, which meet substantially flush with an outer rubber skin 49. In an embodiment, the plastic shell 17 interfaces with the inner stainless steel cup 14 using a design similar to other travel cups powered by a 12 volt power supply.

According to further embodiments, the rubber skin 49 comprises fins 46. For example, two sets of fins may be included—one upper row of fins and one lower row of fins. Fins 46 may be configured to project out from rubber skin 49 in a substantially perpendicular fashion. The rubber used for fins 46 may be flexible and/or durable to facilitate allowing the fins to deform and/or bend when the cup warmer is placed and/or twisted into an automobile cup holder. The deformation of the fins facilitates retaining and securing the cup warmer in the vehicle cup holder. Although fins have been described to facilitate retaining and securing the cup warmer in the vehicle cup warmer, it should be understood that various other structures and/or materials may accomplish a similar objective. For example, a gripping surface that contains ridges, nubs, knobs, or the like may facilitate retaining and securing the cup warmer. Further, different materials that may be deformable, such as flexible rubber, may be utilized in accordance with embodiments of the present invention.

In various embodiments, the versatility of plastic allows for more creative and/or diverse geometric shaping of the plastic shell. For example, the plastic shell may have a wider rim 47 and/or base 48 to abut the outer rubber skin 49, thereby preventing and/or restricting the rubber skin 49 from slipping off the cup warmer. The plastic shell 17 is also configured to reduce heat transfer, such that sophisticated rubberized materials like closed-cell foam may not need to be utilized for the outer skin 49. In other embodiments, standard rubber materials similar to those used as grips on travel mugs may be employed.

A method of using cup warmer 10 according to an embodiment of the invention will now be disclosed. Cup warmer 10 may be placed in a vehicle cup holder. In an embodiment where the vehicle cup holder is not already connected to a vehicle power supply, vehicle power adapter 50 may be connected to cup warmer 10. A beverage container at least partially filled with a liquid may then be disposed within inner surface 14 of cup warmer 10, thereby actuating plunger switch 15 and activating heating coil 12. When the beverage consumer desires to drink the liquid within the beverage container, he removes the beverage container from cup warmer 10, drinks the beverage, and then returns the beverage to cup warmer 10. While the beverage container is removed from cup warmer 10, plunger switch 15 is not actuated, and current is not flowing through heating coil 12.

It should be understood that various principles of the invention have been described in illustrative embodiments. However, many combinations and modifications of the above-described formulation, proportions, elements, materials, and components used in the practice of the invention, in addition to those not specifically described, may be varied and particularly adapted to specific environments and operating requirements without departing from those principles. Other variations and modifications of the present invention will be apparent to those of ordinary skill in the art, and it is the intent that such variations and modifications be covered by this disclosure.

The invention claimed is:

1. A cup holder for a cardboard cup, comprising:
a heating surface configured to receive the cardboard cup;
an outside surface concentric with the heating surface;
a heating element disposed between the heating surface and the outside surface, wherein the heating element is configured to heat the heating surface to a heating temperature; and
a pressure sensitive switch located in a bottom portion of the heating surface, wherein the pressure sensitive switch allows a current to run through the heating element in response to the cardboard cup exerting a toggle pressure on the pressure-sensitive switch.

2. The cup holder of claim 1, further comprising insulation disposed between the heating surface and the outside surface, wherein the insulation is configured to maintain the outside surface at an outside temperature lower than the heating temperature, and wherein the insulation is a foam insulation.

3. The cup holder of claim 1, wherein the toggle pressure is a pressure generated by a weight of the cardboard cup.

4. The cup holder of claim 3, wherein the weight of the cardboard cup includes a liquid weight of an amount of liquid within the cardboard cup.

5. The cup holder of claim 4, wherein the pressure sensitive switch allows the current to run through the heating element in response to the amount of liquid being greater than about one percent to about ten percent of a total volume of the cardboard cup.

6. The cup holder of claim 4, wherein the toggle pressure is not sufficient to toggle the pressure-sensitive switch if the amount of the liquid in the cardboard cup is less than about one percent to about ten percent of a total volume of the cardboard cup.

7. The cup holder of claim 1, wherein the outside surface comprises a grip material that includes at least one of a rubberized skin and a ribbed surface.

8. The cup holder of claim 1, wherein the outside surface is at least one of stainless steel, plastic, and ceramic, and wherein the inside surface is at least one of aluminum and stainless steel.

9. The cup holder of claim 1, wherein the heating element is wrapped around the heating surface, and wherein the heating element is disposed within a temperature resistant adhesive.

10. The cup holder of claim 1, further comprising an indicator configured to indicate that the current is running through the heating element, wherein the indicator includes at least one of a light and a buzzer.

11. A cup holder, comprising:
 a cavity having a horizontal surface and a substantially vertical surface, wherein the cavity is configured to receive a cardboard cup;
 an outside surface that is substantially concentric with the substantially vertical surface of the cavity;
 a heating element disposed proximate to the substantially vertical surface and between the cavity and the outside surface, wherein the heating element is configured to heat the substantially vertical surface of the cavity; and
 a pressure-sensitive switch disposed within the cavity, wherein the pressure-sensitive comprises a first position and a second position, wherein the cardboard cup depresses the pressure-sensitive switch, thereby toggling the pressure-sensitive switch from the first position to the second position, and wherein the pressure-sensitive switch in the second position allows a current to run through the heating element.

12. The cup holder of claim 11, wherein the pressure-sensitive is adjacent the horizontal surface of the cavity, and wherein the pressure-sensitive switch comprises a trigger that protrudes vertically through the horizontal surface.

13. The cup holder of claim 11, wherein the pressure-sensitive switch is disposed on the substantially vertical surface of the cavity.

14. A system, comprising:
 a cardboard cup having a base and a wall, wherein the cardboard cup is configured to hold a beverage; and
 a cup holder configured to hold the cardboard cup, wherein the cup holder comprises:
  a pressure-sensitive switch oriented vertically within the cup holder, wherein the pressure-sensitive switch is configured to be toggled in response to the cardboard cup being placed within the cup holder; and
  a heating element configured to heat the beverage through at least one of the base and the wall of the cardboard cup, in response to the cardboard cup toggling the pressure-sensitive switch.

15. The system of claim 14, wherein the cup holder is integrated in a vehicle cup holder.

16. The system of claim 14, further comprising a power source that comprises at least one of a direct current power source, an alternating current power source, a battery, and a vehicle power source.

17. The system of claim 16, wherein the heating element comprises a thermoelectric chip in electrical communication with the power source to regulate at least one of a temperature of the beverage, and a current running through the heating element.

18. The system of claim 16, further comprising a switch coupled to at least one of the power source and the heating element, wherein the switch in an on position allows a current to run through the heating element.

19. The system of claim 14, further comprising a vehicle receptacle comprising a slot, wherein the cup holder comprises a guiding key configured to guide the cup holder into the vehicle receptacle, and wherein the cup holder further comprises an o-ring to facilitate maintaining the cup holder in the vehicle receptacle.

20. The system of claim 19, wherein the vehicle receptacle includes an electrical contact in electrical communication with a power source, and wherein the cup holder is configured to be twisted within the vehicle receptacle to facilitate providing power to the cup holder and to facilitate maintaining the cup holder within the vehicle receptacle.

\* \* \* \* \*